United States Patent [19]

Ligas et al.

[11] Patent Number: 5,289,547
[45] Date of Patent: Feb. 22, 1994

[54] AUTHENTICATING METHOD

[75] Inventors: John S. Ligas, Export; Steven W. Weber, Pittsburgh, both of Pa.

[73] Assignee: PPG Industries, Inc., Pittsburgh, Pa.

[21] Appl. No.: 802,907

[22] Filed: Dec. 6, 1991

[51] Int. Cl.$^5$ .............................................. G06K 9/32
[52] U.S. Cl. .......................................... 382/7; 283/95; 428/207; 428/916
[58] Field of Search ..................... 382/7, 61; 428/207, 428/211, 916, 221; 283/72, 95, 85, 114; 162/140, 162

[56] References Cited

U.S. PATENT DOCUMENTS

| | | | |
|---|---|---|---|
| 4,863,783 | 9/1989 | Milton | 428/207 |
| 4,881,268 | 11/1989 | Uchida et al. | 382/7 |
| 4,947,441 | 8/1990 | Hara et al. | 382/7 |
| 4,973,851 | 11/1990 | Lee | 382/7 |
| 4,989,280 | 1/1991 | Abe | 382/7 |

FOREIGN PATENT DOCUMENTS

| | | |
|---|---|---|
| 327788 | 8/1989 | European Pat. Off. . |
| 328320 | 8/1989 | European Pat. Off. . |
| 442166 | 8/1991 | European Pat. Off. . |
| 1-262194 | 10/1989 | Japan . |
| 2-77628 | 3/1990 | Japan . |
| 3-66024 | 3/1991 | Japan . |
| 3-114872 | 5/1991 | Japan . |
| 90/06539 | 6/1990 | PCT Int'l Appl. . |
| 2229189 | 9/1990 | United Kingdom . |

OTHER PUBLICATIONS

Rounds et al, *Factors Contributing to Intrinsic Loading Capacity in Silica–Based Packing Materials for Preparative Anion–Exchange Protein Chromatography,* Journal of Chromatograph, 362 1986) 187–196.

Lindquist et al, *The Role of Polyelectrolyte Charge Density and Molecular Weight on the Adsorption and Flocculation of Colloidal Silica with Polyethylenimine,* Journal of Colloid and Interface Science, vol. 55, No. 1, Apr. 1976, 45–59.

*Introduction,* Dow Chemical Company, Date Unknown, pp. 1–33.

*Primary Examiner*—Joseph Mancuso
*Attorney, Agent, or Firm*—Frank P. Mallak; Irwin M. Stein

[57] ABSTRACT

An improved method for authenticating articles is described. A mixture of at least two photochromic compounds that have different absorption maxima in the activated state and also preferably other different properties are incorporated into a carrier composition, e.g., ink, paint, fiber or polymer used to form the authenticating display data on the article. The authenticating display data is subjected to various steps of the authenticating method that may include preferential activation of less than all of the photochromic compounds, activation of all the photochromic compounds, preferential bleaching of less than all of the photochromic compounds, and bleaching of all the photochromic compounds. Subsequent examination of the display data following the various activation and bleaching steps by verifying means enables the article to be authenticated.

20 Claims, No Drawings

AUTHENTICATING METHOD

DESCRIPTION OF THE INVENTION

The present invention relates to an improved method for authenticating articles. More particularly, this invention relates to the use of a mixture of at least two photochromic compounds, the activated spectra of such photochromic compounds having different absorption maxima, in an ink or other suitable carrier composition that is used to form or otherwise provide authenticating display data on the article. The authenticating method is applied to the display data, which method may comprise various steps including preferential activation of less than all of the photochromic compounds, activation of all of the photochromic compounds, preferential inactivation or bleaching color, i.e., color reversion, of less than all of the photochromic compounds, and color reversion of all the photochromic compounds. Examination of the display data by various verifying means during the different activation and reversion steps of the authenticating method enables identification of the resulting absorption maxima, colors or other characteristic properties of one or more of the photochromic compound(s), thereby resulting in authentication of the article.

The use of photochromic compounds in security devices for the purpose of authentication has been described in various publications, e.g., European Patent 328,320, wherein one or more threads of a photochromic yarn comprising fiber containing or treated with a photochromic compound or mixture of photochromic compounds are used as a security device in woven material. In International Patent WO 90/06,539, a security mark is obtained using a photochromic compound covered by a controlled absorption layer that prevents detectable changes in the photochromic compound at light intensities below the defined threshold of the absorption layer and permits detectable changes in the security mark at light intensities above the threshold. European Patent 327,788, describes photochromic printing inks that are used in the field of security documents. In Japanese Patent publication 1-262194, a photochromic card used in gate passing systems contains display data on the card formed with an ink that includes an organic photochromic substance.

British Patent GB 2,229,189 describes printing inks containing photochromic pigments comprising a photochromic dye uniformly dispersed or dissolved within a translucent thermoset polymer matrix and their use in durable security documents, such as a banknote or credit card. Japanese Patent Publication 3-66024 describes a magnetic card with a reloadable recording display to which a photochromic material has been applied. Optical or thermal treatment is used to display the usage data of the card on the recording display in a form visible to the eye, such as letters or numbers. Japanese Patent Publication 3-114872 describes printed matter prepared with photochromic compounds and a recognition method that uses infrared sensors. Japanese Patent Publication 2-77628 describes a non-security related application wherein an actinometer that is used for indicating the amount of ultraviolet radiation uses at least two types of photochromic materials which have different colors when colored by ultraviolet radiation and have different sensitivities to ultraviolet light.

European Patent Application 442,166 describes illuminometers that measure light intensity. These instruments contain a polymeric material that contains one or more photochromatic substances belonging to the class of spiro(indolino)naphthoxazines.

In accordance with the present invention, a combination of at least two photochromic compounds, the activated spectra of which compounds have identifiably different absorption maxima, are incorporated into a carrier composition, e.g., a colored or colorless ink composition, polymeric material, or other carrier compositions to form the authenticating display data on or in an article. In one embodiment, the photochromic compounds may be components of an extruded polymer which serves as the authenticating display data and which is appended to the article to be authenticated; or in another embodiment, the photochromic compounds are incorporated into the polymer formulation of the article so that the entire article serves as the authenticating display data. In a still further embodiment, the photochromic compounds are incorporated into a colored or colorless ink carrier composition which is used to print the display data on the article. The ink composition can be any color commonly used for printing on the article, e.g., documents, currency, etc., such as green, black, brown or gray.

The present invention differs from prior described uses of photochromic compounds in authenticating applications in that the photochromic compounds used in the display data described herein are selected for use based on their different photochromic properties, and the authenticating method includes activation and color reversion sequential steps. The photochromic properties considered when selecting photochromic compounds used in the authenticating method of the present invention can include absorption maxima, activation rate, fatigue rate, fade rate, color changes, and the time interval during which color changes occur after bleaching by thermal means, exposure to white light or removal of the activating source.

By using combinations of photochromic compounds having instrumentally identifiable different activated spectra and preferably also other identifiable different photochromic properties, a verifying instrument can be used to identify the individual photochromic compounds used in the display data and thereby authenticate the article. Basing authentication on different activated spectra and other defined characteristic photochromic properties of at least two photochromic compounds enables a large number of combinations and permutations which may be used to authenticate an article, which also increases substantially the difficulty of copying the total system, thereby facilitating the identification of counterfeit articles.

DETAILED DESCRIPTION OF THE INVENTION

The authenticating method of the present invention may be used to authenticate security documents and other articles of commerce. Documents for which authentication may be desired include banknotes, currency, stock certificates, bonds, visas, passports, stamps, driver's licenses, permits, tickets, credit cards, cash withdrawal cards, check cards, access cards, travelers checks, bank checks and remote access control cards. Other articles of commerce for which verification of authenticity is important, may include building materials, labels for clothing, food, drug or medicinal packaging, machine parts, business equipment, components of manufacture, pharmaceuticals, toys, etc.

The authenticating display data may be the entire article, if the photochromic compounds are incorporated into the material, e.g., polymeric material, used to form the article, or it may be appended to the articles to be authenticated. The display data may appear as a visible or invisible display to the human eye when viewed under visible light. It may consist of characters, letters, numbers, colors or designs printed directly onto or in the matrix of the article (or a coating applied to the article), or on a label permanently or removably affixed to the article. The display data may be formed with a carrier composition in the form of an ink, paint, fiber or a polymeric material which may be used to form the article to be authenticated, a portion of the article to be authenticated, or a label-type device appended to or attached to the article, e.g., a tag, sticker, stamp, etc., containing two or more photochromic compounds, the activated spectra of which have different absorption maxima.

Photochromic compounds (dyes) are chemical species that undergo a reversible change in color. This phenomena is known as photochromism. It may be defined as the property of a compound to reversibly change its visible light absorption spectrum after exposure to and absorption of energy radiation of a certain wavelength or wavelength range, such as ultraviolet light. The original absorption spectrum of the photochromic compound is generally restored, after removal of the activating energy radiation, e.g., by removal of the light source including the activation wavelength, e.g., by placing the compound in the dark, or by thermal treatment, e.g., by gentle heating, or by exposing the activated photochromic compounds to bleaching light means, e.g., light substantially free of activating ultraviolet light, e.g., white light. Such means of reversing the activation state of the photochromic compound will be referred to as "bleaching means". The properties of a photochromic compound that may be considered in selecting a compound for use in an authenticating data display are its activation wavelength, absorption maximum, (or maxima if more than one peak in the visible absorption spectrum is present), activation rate, fatigue rate, fade rate, color changes during activation and bleaching, and time interval during which the color changes occur after bleaching by thermal means, exposure to white light or removal of the activating light source.

The activation wavelength or absorption maxima (UV) is the wavelength in the ultraviolet range closest to the visible spectrum at which the maximum absorption of the photochromic compound occurs and causes a shift in the absorption spectrum in the visible range which produces a characteristic color in the display data. The absorption maximum (visible) is the wavelength in the visible spectrum at which the maximum absorption of the activated (colored) form of the photochromic compound occurs. The activation rate is measured as the time, e.g., in seconds, required for the photochromic compound to reach the highest absorbance after activation under controlled test conditions. The fatigue rate is the measurable loss of photochromic activity of the compound which may result from repeated exposure to activating light sources or other mechanisms that effect the reversible change in color characteristic of the photochromic compound.

Bleaching or reversion of the colored (activated) state of photochromic compounds to the uncolored state may result in the formation of unique colors during the bleaching process. Bleaching can occur by thermal treatment, i.e., gentle heating for example at 70° C. for 10 seconds, exposure to white light such as light from a xenon camera flash unit having a filter that excludes ultraviolet light, or removing the activating source of light and waiting an interval of time that corresponds to the fade or decay rate of the specific photochromic compound. The fade rate may be reported as the loss in absorbance over time, e.g., in seconds. For comparative purposes, the fade rate is determined under test conditions controlling the following: light exposure, time, temperature and concentration of the photochromic compound incorporated into the display data. Light exposure is commonly performed with a Xenon light source. Fade rate is often reported as a half-life value indicating the amount of time required for the absorbance to be reduced to one-half of the highest absorbance after activation under controlled test conditions.

Selection of photochromic dyes for incorporation into the display data are based on the different photochromic properties of the photochromic dyes and the particular authentication method contemplated. In one contemplated authenticating embodiment, two or more photochromic compounds having different absorption maximums are incorporated into the display data. The display data is exposed to a source of activating light which activates at least one of the photochromic dyes contained therein. All of the photochromic dyes may be activated or less than all of the photochromic dyes may be activated. When less than all of the photochromic dyes are activated, a source of activating light that provides specific activation wavelengths correlated with the activation wavelengths of the dyes to be activated is used. The light source may be a grouping of separate individual light sources or a light source with specific filters to permit the passage of only certain activation wavelengths, thereby to preferentially activate one or more but less than all of the photochromic dyes, and thereby to yield the appropriate color in the display data for authentication. When all of the photochromic dyes are to be activated, a broad spectrum ultraviolet light source may be used.

The foregoing display data is examined by verifying means that identifies at least one characteristic photochromic property of the activated dyes within the display data. Such property or properties may be the absorption maximum or maxima of the activated dye(s), or the color formed by the combination of activated dyes or the activated dyes in further combination with the color of the matrix or carrier composition. The activated dyes are then exposed to bleaching means that inactivates the activated photochromic dyes, preferably less than all of the activated photochromic dyes. For example, white light or thermal means may be used to preferentially inactivate one of the dyes susceptible to bleaching by such bleaching means; or white light and thermal means may be used sequentially to sequentially inactivate dyes susceptible to such bleaching; or removal of the activating light source may, if the appropriate dye is used, result in a unique color as the chosen dye reverts to its inactivated state. After exposure to the bleaching means, the display data is again examined with verifying means that identifies at least one characteristic photochromic property of the resultant level of activation of the photochromic dyes within the display data. Such property may be the feature that the photochromic dye is bleached with white light or heat; the resultant color when one of the activated dyes is inactivated, e.g., leaving one activated dye, and at least one inactivated dye; the resultant colors when activated dyes are inactivated sequentially; the fade rate of the activated dye after removal of the activating light source; or the resultant color of a photochromic dye immediately after exposure to white light or gentle heating.

In a further embodiment, the display data then may be exposed to a source of activating light to activate preferentially one of the contained dyes, e.g., perhaps one not previously activated, and the resultant color or absorption maximum of this dye examined and verified, thereby to impose a further level of authentication on the authenticating method. Alternatively, when one of the dyes is fading, another dye may be activated with a source of light that does not activate the fading dye, thereby to produce a further unique color that can be used to authenticate the article.

In a still further embodiment, one or more of the photochromic compounds selected for the display data may have a characteristic fatigue rate such that one or more photochromic compounds would no longer demonstrate the reversible color change characteristic of the photochromic compounds after being processed for authentication ten times or some other specific number of times.

In another embodiment, one or more of the photochromic compounds selected for incorporation into the display data described above are selected on the basis of fade rate characteristics. Activation of one or more of these photochromic compounds would result in a particular color in the display data which would be present for only a specific time interval. Authentication would be based on the presence of the particular color(s) in the display data during that specific time interval.

More particularly, the following embodiments are contemplated:

A. Expose a display data containing two (or more) photochromic dyes to a source of activating ultraviolet light which activates both (or all) dyes; examine the resultant color of the display data or the absorption maxima of dyes; inactivate one of the dyes (which is white light bleachable) with white light; and examine the resultant residual color.

B. Expose a display data containing two (or more) photochromic dyes to a source of activating ultraviolet light which activates both (or all) dyes; examine the resultant color of the display date; inactivate both dyes, e.g., by white light or thermally; reactivate only one of the dyes, e.g., by using a UV light source equipped with appropriate filter(s) or a variable light source; examine the resultant color of the display data.

C. Expose a display data containing two (or more) photochromic dyes that fade slowly after exposure to heat to a source of activating ultraviolet light which activates both (or all) dyes; examine the resultant color of the display data; thermally bleach both dyes; and examine the resultant color.

D. Expose a display data containing two (or more) photochromic dyes to a variable UV light source that activates only one of the dyes; examine the resultant color; bleach the activated dye; activate another dye with the light source using a different activating UV wavelength; examine the resultant color; bleach the activated dye. (If more than two dyes are used, the process can be repeated sequentially with the other dyes. Further, two of the dyes may be activated at one time to give a different color than the individual dyes. For three dyes, this adds three further levels of authentication, e.g., Dyes 1 and 2, Dyes 1 and 3, and Dyes 2 and 3, provided that the dyes are of different colors, e.g., blue, yellow and red.)

The above illustrations demonstrate only a few of the many possible combinations and permutations that are available for use in the authenticating method by using readily identifiable photochromic properties, e.g., color, absorption maximum, fading due to white light or heat, and fade rate, with at least two photochromic dyes. Depending on the level of complexity desired, it is possible to devise a system for authentication that would employ many of the different photochromic properties of the photochromic compounds used in the display data. Authentication would be based on the identification of several different criteria, e.g., activation wavelength, color, fade rate, etc. of the photochromic compounds used in a specific sequence. The possibility of duplication is minimized by randomly changing the sequence of color outcome necessary for authentication. Evidence of tampering or attempts to activate the display data with ultraviolet (UV) light wavelengths other than those employed in the authentication method could be made possible by the selection and inclusion in the display data of other appropriate photochromic compounds with certain specific tell-tale properties. For example, photochromic compounds that are activated by wavelengths outside the range used for authentication and that have the characteristic of forming a color that masks the color needed for authentication or forms a color that is very stable, long lasting, and resistant to typical bleaching methods may be used. These or other features would be detectable then by verifying means used to indicate tampering.

Photochromic dyes that may be used with the authenticating method of the present invention may be any suitable organic photochromic dye that: (a) provides a measurable photochromic response when incorporated into an authenticating display data and exposed to a source of activating light, (b) is soluble within the carrier composition, e.g., ink or polymer, used to form the display data, and (c) that is chemically compatible with the carrier composition. Photochromic dyes that may be used may be selected from a variety of classes of known photochromic dyes. Particularly contemplated classes of photochromic compounds that may be used include: spiro(indolino)-type compounds, such as spiro(indolino)pyridobenzoxazines, spiro(indolino)naphthoxazines, spiro(benzindolino)pyridobenzoxazines, spiro(benzindolino)naphthoxazines, spiro(benzindolino)naphthopyrans, spiro(indolino)benzopyrans, spiro(indolino)naphthopyrans, spiro(indolino)quinopyrans, spiro(indolino)benzoxazines, spiro(benzindolino) benzoxazines, chromenes, e.g., benzopyrans and naplithopyrans, metal dithizonate compounds, fulgides or fulgimides and spiro(di)hydroindolizines.

The particular photochromic substance(s) selected for use will depend on its compatibility with the carrier composition, including its solubility therein, the particular change in color desired for the photochromic article, and the desired physical properties hereinbefore described that are to be used in the authenticating method. For simplicity, the use of two different photochromic dyes is contemplated. Where more detailed authentication is required, the use of three different photochromic dyes (which yield different colors when activated) is contemplated. The particular photochromic dye used is not critical to the practice of the present invention provided that it satisfies the above-described criteria. Hence, it is contemplated that the present invention is applicable to photochromic dyes known and presently unknown which satisfy the aforesaid criteria.

Photochromic compounds that may be utilized to prepare photochromic articles of the present invention, such as those heretofore described, are for the most part described in the open literature. For example, spiro(indolino)naphthoxazines have been described, among others, in U.S. Pat. Nos. 3,562,172, 3,578,602, 4,215,010 and 4,342,668. Spiro(indolino)pyridobenzoxazines are described in U.S. Pat. No. 4,637,698. Spiro(benzindolino)pyrido benzoxazines and spiro(benzindolino)-naphthoxazines are described in U.S. Pat. No. 4,931,219. Spiro(benzindolino)naphthopyrans are described in Japanese patent publication 62/195383 and are represented by the general formula (A).

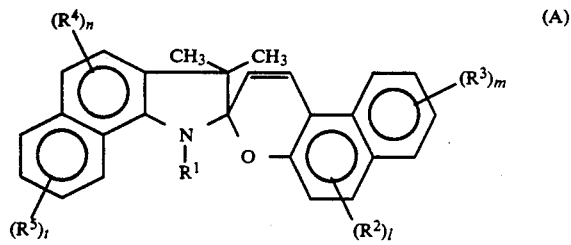

wherein each $R^2$, $R^3$, $R^4$ and $R^5$ may be the same or different and are alkyl radicals having 1-4 carbons, halogen-substituted alkyl radicals having 1 or 2 carbons, alkoxy radicals having 1-4 carbons, halogen, or the nitro radical, 1 and n are integers of 0-2, m and t are integers of 0-4; $R^1$ represents an unsubstituted or substituted alkyl radical having 1-20 carbons, an unsubstituted or substituted cycloalkyl radical having 3-10 carbons, an unsubstituted or substituted aralkyl radical having 7-20 carbons, or an unsubstituted or substituted aryl radical having 6-14 carbons.

Spiro(indolino)benzoxazines are described in U.S. Pat. No. 4,816,584. Spiro(indolino)benzopyrans, spiro-(indolino)naphthopyrans and spiro(indolino)quinopyrans are described, for example, in U.S. Pat. No. 4,880,667. Spiro(indolino)pyrans are also described in the text, *Techniques of Chemistry*, Volume III, "Photochromism", Chapter 3, Glenn H. Brown, Editor, John Wiley and Sons, Inc. New York 1971.

Photochromic organs-metal dithizonates, i.e., (arylazo)thioformic arylhydrazidates, e.g., mercury dithizonates, are described in, for example, U.S. Pat. No. 3,361,706. Fulgides and fulgimides, e.g., the 3-furyl and 3-thienyl fulgides and fulgimides are described in U.S. Pat. No. 4,220,708. 3-pyrrol fulgides and fulgimides are described in U.S. Pat. No. 2,170,202. Spiro(di)hydroindolizines are described, for example, in U.S. Pat. No. 4,931,220 at column 20, line 65 through column 21, line 38. Certain chromenes, i.e., benzopyrans and naphthopyrans, are described in U.S. Pat. No. 3,567,605 and U.S. Pat. No. 4,826,977.

Those portions of the aforementioned identified patent publications and applications that describe the various photochromic compounds generically and specifically are hereby incorporated in toto by reference. In particular, column 8, line 52 through column 22, line 40 of U.S. Pat. No. 4,931,220, which describes specific spiro(indolino)-type photochromic compounds and other photochromic compounds and the disclosure relating thereto are incorporated herein in toto by reference.

Examples of potential combinations of photochromic compounds are as follows:

spiro(indolino)benzoxazines and spiro(benzindolino) naphthoxazines;

spiro(indolino)benzoxazines and spiro(indolino) pyridobenzoxazines;

spiro(indolino)benzoxazines and chromenes;

chromenes and spiro(benzindolino)naphthoxazines;

chromenes and spiro(indolino)pyridobenoxazines;

spiro(indolino)benzoxazines, chromenes and spiro(-benzindolino)naphthoxazines;

spiro(indolino)benzoxazines, chromenes and spiro(indolino)pyridobenzoxazines;

diarylbenzopyrans and spiro(benzindolino)naphthoxazines;

Incorporation of the photochromic compounds into the carrier composition may be achieved by various methods. For example, the photochromic compounds may be blended into a polymer, e.g., a thermoplastic light-transparent polymer, by mixing the polymer and photochromic compounds together at temperatures between 50° C. and 150° C. and after achieving a homogeneous dispersion, allowing the mixture to cool to ambient temperature. The resulting solid may be broken into smaller particles which are micronized in suitable size reducing equipment to a particle size in the pigment range of 1 to 20 microns before addition to the ink or carrier composition. Examples of suitable polymers include, but are not limited to, polyvinylchloride, nylons, fluorocarbons, linear polyethylene, polyurethanes, polycarbonates, polystyrene, polypropylene, ethylene-vinyl acetate copolymers, poly(diethylene glycol bis(allyl carbonate)), polyesters and cellulose esters, e.g. cellulose acetate and cellulose acetate-butyrate and acrylic (or methacrylic) resins.

Further methods for incorporating photochromic compounds into a carrier composition may be by coating or encapsulating such compounds in a polymer shell, i.e., in the form of microcapsules. Coated photochromic compounds may be formed by coating the finely divided photochromic compounds with a solution of the polymer in a volatile solvent and then rapidly evaporating the solvent. The microencapsulated photochromic compounds are prepared according to well-known methods of microencapsulating or coacervation using gelatin or acacia gum as a wall material or by encapsulation of the photochromic compound together with water-insoluble polyamines and water-soluble bisulfite adducts of polyisocyanates as described for example in U.S. Pat. Nos. 4,428,978 and 4,517,141, which are incorporated herein by reference. Other methods for incorporating the photochromic compounds into a polymer are by imbibition into the particles of the polymer or by extruding, molding or casting with the polymer. For polymers that are used as protective overlays, the photochromic compounds may be added to the adhesive used to attach the overlay taking into consideration the concerns cited hereinafter for directly incorporating the photochromic compounds.

A still further method comprises incorporating the photochromic compounds directly into the carrier composition, e.g., a printing ink, taking into consideration that the amount and nature of functional groups in, for example, the binder resin of the printing ink, the constituents of a polymer composition, or constituents formed during chemical hardening, should be such that they do not substantially interfere with the photochromic compound or the photochromic coloring reaction. In some cases, it may be useful to adsorb the photochromic compounds onto clay or silica prior to incorporating them into the carrier composition. Another method of incorporation comprises adding the photochromic compound to a polymerizable composition including a polyfunctional acrylate monomer and polymerizing the resultant admixture, e.g., by emulsion polymerization, as described in U.S. Pat. No. 4,931,220, which is incorporated herein by reference.

Photochromic compounds are generally highly reactive and may undergo chemical and photochemical changes in the complex medium of printing inks and polymeric carrier compositions. In order to make them more stable, longer lasting and protected from unwanted activation and sunlight, adjuvant materials may be incorporated into the carrier composition. These materials are used at concentrations that do not substantially interfere with the verifying means used to authenticate the article. For example, ultraviolet light absorbers may be used that will prevent activation of the photochromic compound at low intensities of light such as found in sunlight, but will not prevent activation of the photochromic compound at higher intensities used in the verifying means. For example, ultraviolet light absorbers may be added to the carrier composition before incorporation of the photochromic compounds or be premixed with the photochromic compounds before their formulation into the carrier composition, or such absorbers may be superposed, e.g., superimposed, as a layer between the photochromic-containing display data and the incident light. Further, stabilizers for the photochromic compounds may be admixed with the carrier composition to improve the light fatigue resistance of the photochromic compounds or, such stabilizers may be diffused into the surface of the authenticating display data so as to be juxtaposed to the photochromic carrier composition.

Conventional ultraviolet light absorbers such as benzophenone and benzotriazole-type compounds are contemplated for use in conjunction with the photochromic compound(s) incorporated into the authenticating display data. Stabilizers, such as hindered amine light stabilizers and singlet oxygen quenchers, e.g., a nickel ion complex with an organic ligand, are also contemplated for use with the photochromic compound(s). The hindered amine and singlet oxygen quencher may be used alone or in combination. Hindered amine light stabilizers are known in the art and are described in U.S. Pat. No. 4,720,356. These stabilizers typically comprise derivatives of tetramethyl piperidine. The disclosure of U.S. Pat. No. 4,720,356 respecting hindered amine compounds and singlet oxygen quenching compounds is incorporated herein by reference.

The photochromic compounds will be selected according to the criteria described above and incorporated into the carrier composition via the methods previously described. The invention contemplates the use of different printing inks for use in a variety of printing methods such as, flexographic printing, gravure or heliogravure printing, intaglio (steel engraving) or plate printing, letterpress printing, indirect letterpress printing, dry offset printing, lithographic or wet offset printing and screen printing. All of these printing methods are well known to the individual skilled in the printing art. The different basic ink compositions are also well known to one skilled in the printing art and will, therefore, not be described here in detail.

The photochromic-containing carrier compositions of the invention will contain at least two different photochromic compounds in concentrations comprising, in toto, between about 0.01 and 10.0% by weight of the carrier composition. Photochromic compound-containing printing inks of this invention may be used for the printing of identification or forgery detection marks or patterns as authenticating display data on security documents and other articles of commerce. Polymeric carrier compositions containing photochromic compounds may be extruded or otherwise formed into photochromic materials that may be used to authenticate such materials, or articles to which such materials are applied. Photochromic printing inks and polymeric compositions may be applied to or incorporated within security document(s) or other articles of commerce in the form of characters, numbers, symbols, designs, colors or combinations thereof, thereby to provide an authenticating display data.

In order to authenticate the article in accordance with the present method, the display data is subjected to various authenticating steps that may include at various times preferential activation of less than all of the photochromic compounds, activation of all the photochromic compounds, preferential bleaching of less than all of the photochromic compounds, and bleaching of all the photochromic compounds. Examination of the display data subsequent to and/or during the different activation and bleaching steps by various verifying instrument means (including the human eye) enables the identification of various photochromic properties such as the resulting absorption maximum, interim color after treatment or combined color outcome, thereby permitting authentication of the article.

The means for verification may be by a visual observation or by the use of an instrument such as a colorimeter or similar device for comparing or matching colors and shapes. Another instrument may be an automated shape, color recognition and verification device. Such a device may be composed of individual components for shape and color recognition that supplies signals to a microprocessor or controlling device or a single system that will accomplish the same task and authenticate the display data. Components that may be used for color recognition are a spectrophotometer or similar instrument that measures the spectral reflectance or transmittance curves of the activated or reverting photochromic compounds in the display data. Color sensitive electronic components include photodiodes, phototransistors, light dependent resistors, PIN diodes, etc., which when used in an electronic comparator, sense the color difference in the display data and provide a signal responsive to the color change. A suitable shape recognition device is a scanner with optical character recognition capabilities or similar instrument.

According to the present invention, authenticating display data for a plastic access card may, for example, be produced by adding the photochromic compounds into the plastic material used to make the card, into the ink used to print information on the card, or into the plastic overlay protecting the surface of the card. Using the photochromic amounts of photochromic compounds, for example, selected from Table I, it is possible to develop a four-level security access system using three cards. The first level would regulate and permit entry to the facility. The second, third and fourth levels of security might permit access to restricted areas 1, 2 and 3. Each of the three cards would be prepared so that when the display data was activated under a source of UV light (300-400 nm) a similar gray coloration of the display data results. Display data for Restricted Area 1 could contain compounds PC-B (orange) and PC-D (blue). Display Data for Restricted Area 2 could contain compounds PC-A (yellow), PC-D (blue) and PC-E (purple). Display data for Restricted Area 3 could contain compounds PC-A (yellow), PC-C (purple) and PC-D (blue).

Since each card demonstrates a gray coloration under UV light, an individual checking cards at the initial point of entry would need to visually examine the cards after exposing it to UV light (300-400 nm) and verify the presence of a gray color. Before returning the card, the gray color would be bleached by exposure to white light and heat. Subsequently, gaining access to each of the other areas would be by instrument verification of the components of the gray coloration.

For example, the verification method for Restricted Area 1 might involve activating the card for that area by exposure to UV light in the range of 345 nm to 355 nm using a laser light source of specific wavelength(s) or a UV light with filters. This causes the gray coloration to form which would be examined by an instrument such as the Minolta ® Chroma Meter CR-110. The Minolta ® Chroma Meter or similar device would generate a numerical color code for the display data. A numerical color code may be expressed using the L*a*b* Color Notation System or the Yxy Fundamental Psychophysical Color Order System. The color code would be transmitted to a microprocessor that would compare it to a previously determined acceptable range. Verification of the authenticating display data would occur if the numerical color code was within the acceptable range. After activation and gray color verification, the card could be exposed to white light which would bleach the blue color leaving an orange color which would then be further verified by color analysis. Subsequently, the activated compounds would be bleached by heating before returning the card to the individual seeking access. Since the card (display data) was authenticated, access to Restricted Area 1 would be allowed.

For Restricted Area 2, the initial gray coloration could be confirmed by exposing the card to UV light of 300-360 nm. Afterwards, the card could be bleached by white light and heat. Then, the card could be exposed to UV light of 300-310 nm, which would cause the compound PC-E to activate and appear as a purple coloration, which would be verified by color analysis as described above, and subsequently bleached before returning the card to the individual seeking access. Since the card (display data) was authenticated, access to Restricted Area 2 would be allowed.

For Restricted Area 3, the gray coloration could be confirmed by exposure to UV light of 300-350 nm. After bleaching, the card would be exposed to UV light of 345-360 nm to activate the compounds PC-A and PC-D to form a green color. After color verification the card would be bleached of all colors before returning to the individual seeking access. Since the card (display data) was authenticated, access to Restricted Area 3 would be allowed.

The photochromic compounds used in the following examples were selected from the materials listed in Table I.

TABLE I

Photochromic Properties of Selected Compounds

| Compound | Activated Color | Activation WL | Maximum AbsWL | Fade Rate (Half Life) |
|---|---|---|---|---|
| PC-A | Yellow | 359 | 432 | 40 (seconds) |
| PC-B | Orange | 355 | 476 | >1800 (seconds) |
| PC-C | Purple | 300 | 563 | 170 (seconds) |
| PC-D | Blue | 345 | 608 | 122 (seconds) |
| PC-E | Purple | 303 | 566 | 214 (seconds) |

PC-A = 3,3-diphenyl 3H-naphtho[2,1-b]pyran
PC-B = 2,2-diphenyl 2H-naphtho[2,3-b]pyran
PC-C = 5,7-dimethoxy-1',3',3',4',(and 6') 5'-pentamethyl spiro[2H-1,4-benzoxazine-2,2'-indoline]
PC-D = 1,3,3,4(and 6),5-pentamethyl spiro[indolino-2,3'-[3H]pyrido[3,2-f][1,4]benzoxazine]
PC-E = 5,7-dimethoxy-3'-ethyl-1'-propyl- 3',4'(and 6'), 5'-trimethyl-spiro[2H-1,4-benzoxazine-2,2'-indoline]

EXAMPLE 1

A green photochromic poster ink, which was transparent when applied but green when activated with 365 nm UV light, was prepared by adding 4.0 grams (g) of photochromic compound PC-A to 400 g of clear ethyl cellulose, and mixing with the resalting solution 96 g of a 1% solution of photochromic compound PC-D in clear ethyl cellulose.

A brown photochromic poster ink, which was transparent when applied but brown when activated with 365 nm UV light, was prepared by adding 2.0 g of photochromic compound PC-A to 450 g of ethyl cellulose, and mixing with the resulting solution 2.5 g of compound PC-C and 50 g of a 1% solution of the photochromic compound PC-A in clear ethyl cellulose.

A gray photochromic poster ink, which was transparent when applied but gray when activated with 365 nm UV light, was prepared by adding 3.35 g of photochromic compound PC-C to 335 g of ethyl cellulose, and mixing with the resulting solution 110 g of a 1% solution of the photochromic compound PC-A in clear ethyl cellulose and 57 g of a 1% solution of the photochromic compound PC-D in clear ethyl cellulose.

The photochromic inks prepared above were printed onto 10 point Frankcote cards using a 196 mesh screen. The amount of ink applied for each photochromic was approximately 0.14 g per card for the green ink, 0.12 g per card for the brown ink and 0.13 g per card for the gray ink.

The photochromic-ink printed cards were activated behind 4 different UV filters using 2 different UV sources, i.e., a single exposure to an electronic camera flash unit with the front filter removed, and a three minute exposure to a 365 nm UV light (Spectroline Model XX-40). The results are listed below in Table II.

TABLE II

Colored Responses of Cards Printed with
Different Photochromic Inks after Exposure to
Filtered and Unfiltered UV light from Two Different Sources

| PHOTOCHROMIC INK: | 365 nm UV LIGHT | | | CAMERA FLASH | | |
|---|---|---|---|---|---|---|
| FILTERS* | BROWN | GRAY | GREEN | BROWN | GRAY | GREEN |
| NONE | B | GY | GR | B | GY-PL | GR |
| WG-320 | B | GY | GR | L-B | GY | L-GR |
| WG-360 | Y | GR | GR | Y | GR | L-GR |
| 7-54 (VISIBLE) | B | GY | GR | B | GY | GR |
| 3-72 (UV) | C | C | C | C | C | C |

*Products of ESCO Products Inc.,
B = BROWN
GY = GRAY
GR = GREEN
Y = YELLOW
PL = PURPLE
L = LIGHT
C = COLORLESS The results of Table II show that compound PC-C was not activated after exposure to light that excluded wavelengths of 360 nm and below since the card printed with the brown photochromic poster ink, which contained compounds PC-A (yellow) and PC-C (purple), and on cards printed with the gray photochromic poster ink, which contained compounds PC-A PC-C and PC-D (blue) were yellow and green respectively when activated with light passing through the WG-360 filter. The use of the 3-72 (UV) filter, which excludes wavelengths of 400 nm and below, prevented the activation of all of the photochromic compounds in the poster inks yielding a colorless result on each of the coated cards.

As used herein, the activation wavelength of a photochromic compound is the light wavelength closest to the visible range that activates the photochromic compound. However, there may be light energy of other wavelengths, e.g., at the lower end of the UV range, i.e. 0.1 to 300 nm, that may also activate the photochromic compound. This may be the case for the cards printed with the gray photochromic poster ink and exposed to unfiltered light from both sources. Since the camera flash includes wavelengths below 365 nm and compound PC-C also absorbs at wavelengths below the activation wavelength, the resultant gray/purple color after unfiltered exposure to the camera flash may be due to the absorption of lower wavelengths that activated compound PC-C more intensely to produce the gray-purple coloration. This demonstrates the ability to use specific wavelengths to activate the photochromic compounds and produce the desired color that enables authentication of the display data.

EXAMPLE 2

The following photochromic inks were prepared using as the carrier the multi-purpose clear ink, M P-170, available from Ink Dezyne International Ltd., Toronto, Ontario, Canada. The photochromic compounds were added to the clear ink resulting in solutions of approximately 1% concentration on a weight basis. In some instances, not all of the photochromic compound dissolved in the clear ink.

1% Blue photochromic ink using compound PC-D
1% Orange photochromic ink using compound PC-B
1% Yellow photochromic ink using compound PC-A
1% Purple photochromic ink using compound PC-E Subsequently, combinations containing equal proportions on a weight basis of the aforedescribed photochromic inks were prepared as follows Sample 1—mixing 1% Yellow ink and 1% Orange ink.

Sample 2—mixing 1% Purple ink and 1% Orange ink.

Sample 3—mixing 1% Blue ink and 1% Orange ink.

Samples of each photochromic ink combination were applied to cards for further testing. Each of the cards were activated for 3 minutes under 365 nm UV light (Spectroline Model XX-40) and observed for resulting colors immediately before and after activation, and 15 minutes after the activating light was removed (except in one case when the card was also examined after 1.5 minutes). The cards were then reactivated by exposure for 3 minutes under 365 UV light and thermally faded by blowing hot air (approximately 75° C. for approximately 10 seconds) over the cards and the resulting colors were recorded. The cards were reactivated again and then faded with white light using an electronic camera flash with the front filter removed and by placing UV filter 3-72 between the flash unit and the cards. Each time the cards were activated, the same colors listed under column AA were obtained. The results are listed in the Table 3.

TABLE III

Colored Responses of Cards Printed with
Photochromic Ink Samples

| SAMPLE | BA | AA | AF | ATF | AWL |
|---|---|---|---|---|---|
| 1 | L-Y | O | O | O | O |
| 2 | L-B | RD/O | O | O | O |
| 3 | L-GR | GY/BK | O<br>B(1.5) | O | O |

BA = BEFORE ACTIVATION
AA = AFTER ACTIVATION
AF = AFTER 15 MIN. FADING
ATF = AFTER THERMAL FADE
AWL = AFTER WHITE LIGHT
GR = GREEN
L = LIGHT
O = ORANGE
RD = RED
GY = GRAY
BK = BLACK
Y = YELLOW
B = BROWN
(1.5) = RESULTS AFTER 1.5 MINUTES

In this example, each of the cards printed with the photochromic inks had a residual color from the ink that appeared as a slight trace of color and is described in Table III as a light color before activation. Sample 1 and 2 show a simple system that involves one or two color changes. Sample 3 show a more elaborate system with a card demonstrating one color in visible light, light green, a change by activation with 365 nm light to another color, gray/black, a transitional change in color upon fading to brown after 1.5 minutes and then to orange after 15 minutes. This final orange color may be attained more quickly as demonstrated by the results obtained by thermal and white light bleaching.

We claim:

1. An improved method for authenticating an article comprising:
   (a) providing an article having authenticating display data thereon, said display data containing at least two photochromic compounds, the activated spectra of which photochromic compounds exhibit different absorption maxima;
   (b) exposing authenticating display data on the article to a source of activating light, that activates at least one but less than all of the photochromic compounds;
   (c) examining the display data with verifying means that identifies at least one characteristic property of the photochromic compounds comprising the display data;
   (d) exposing activated photochromic compounds contained in the display data to bleaching means that inactivates at least one of the activated photochromic compounds; and
   (e) examining the display data of step
   (d) with verifying means that identifies at least one characteristic property of the resultant level of activation of the photochromic compounds comprising the display data, thereby to authenticate the article.

2. The method of claim 1 wherein the bleaching means are selected from the group consisting of:
   (a) light substantially free of activating ultraviolet light,
   (b) heat treatment,
   (c) removal of the light source including the activation wavelength, and
   (d) a combination of such bleaching means.

3. The method of claim 1 wherein the display data includes features selected from the group consisting of characters, numbers, symbols, designs, colors and combinations of such features.

4. The method of claim 1 wherein the display data is formed with a photochromic compound-containing ink composition, the ink portion of which composition being chemically compatible with the photochromic compounds present therein and being substantially free of ultraviolet light absorbing materials in amounts that interfere with the activation of the photochromic compounds.

5. The method of claim 1 wherein the photochromic compounds are selected from the group consisting of:
   (a) spiro(indolino)pyridobenzoxazines,
   (b) spiro(indolino)naphthoxazines,
   (c) spiro(benzindolino)pyridobenzoxazines,
   (d) spiro(benzindolino)naphthoxazines,
   (e) spiro(benzindolino)naphthopyrans,
   (f) spiro(indolino)benzopyrans,
   (g) spiro(indolino)naphthopyrans,
   (h) spiro(indolino)quinopyrans,
   (i) spiro(indolino)benzoxazines,
   (j) spiro(benzindolino)benzoxazines,
   (k) chromenes,
   (l) metal dithizonate compounds,
   (m) fulgides
   (n) fulgimides,
   (o) spiro(di)hydroindolizines and
   (p) mixtures of such photochromic compounds.

6. The method of claim 1 wherein the activating light is passed through filter means that transmits light energy which preferentially activates less than all of the photochromic compounds in the display data.

7. The method of claim 1 wherein the verifying means includes a shape and color recognition device.

8. The method of claim 7 wherein the shape and color recognition device includes means for comparing and matching colors and shapes.

9. The method of claim 8 wherein the color recognition includes an instrument that measures the spectral reflectance or transmittance curves of the color changes that occur during activation and inactivation of the photochromic compounds in the display data.

10. The method of claim 7 wherein the color recognition device includes color sensitive electronic components selected from the group consisting of phototransistors, light dependent resistors, PIN diodes and mixtures thereof, which when employed with an electronic comparator senses the color change in the display data and provides a signal responsive to the color change.

11. The method of claim 7 wherein the shape recognition device includes a scanner with optical character recognition.

12. The method of claim 7 wherein the output of the shape and color recognition device is fed to a system including microprocessor means that authenticates the display data by visual or audible means.

13. The method of claim 1 wherein there are at least three photochromic compounds in the display data and the activating light source activates less than all but at least two of the photochromic compounds in the display data, and the bleaching means inactivates less than all of the activated photochromic compounds.

14. The method of claim 12 wherein the bleaching means is selected from white light and heat.

15. The method of claim 1 wherein the activating light source activates at least one but not all of the photochromic compounds comprising the display data and the bleaching means inactivates all of the activated photochromic compounds.

16. The method of claim 1 wherein the display data is formed with a photochromic compound-containing polymer composition, the polymer portion of which composition being chemically compatible with the photochromic compounds present therein and being substantially free of ultraviolet light absorbing materials in amounts that interfere with activation of the photochromic compounds.

17. An improved method for authenticating an article comprising:
   (a) providing an article having authenticating display data thereon, said display data containing at least two photochromic compounds, the activated spectra of which photochromic compounds exhibit different absorption maxima;
   (b) exposing authenticating display data on the article to a source of activating light that activates all of the photochromic compounds in said display data;
   (c) examining the display data with verifying means that identifies at least one characteristic property of the photochromic compounds comprising the display data;

(d) exposing the activated photochromic compounds contained in the display data to bleaching means that inactivates less than all of the activated photochromic compounds; and (e) examining the display data of step (d) with verifying means that identifies at least one characteristic property of the resultant level of activation of the photochromic compounds comprising the display data, thereby to authenticate the article.

18. The method of claim 17 wherein the bleaching means is selected from white light and heat.

19. An improved method for authenticating an article comprising:

(a) providing an article having authenticating display data thereon, said display data containing at least two photochromic compounds, the activated spectra of which photochromic compounds exhibit different absorption maxima;

(b) exposing authenticating display data on the article to a source of activating light that activates all of the photochromic compounds in said display data;

(c) examining the display data with verifying means that identifies at least one characteristic property of the photochromic compounds comprising the display data;

(d) exposing activated photochromic compounds contained in the display data to bleaching means that inactivates all of the activated photochromic compounds;

(e) exposing authenticating display data on the article to a source of activating light that activates at least one but less than all of the photochromic compounds comprising the display data; and (f) examining the display data of step (e) with verifying means that identifies at least one characteristic property of the resultant level of activation of the photochromic compounds comprising the display data, thereby to authenticate the article.

20. The method of claim 19 wherein following said further step, the display data is exposed to bleaching means that inactivates at least one activated photochromic compound and the resultant display data is examined with verifying means that identifies at least one characteristic property of the resultant level of activation of the photochromic compounds comprising the display data.

* * * * *

UNITED STATES PATENT AND TRADEMARK OFFICE
CERTIFICATE OF CORRECTION

PATENT NO. : 5,289,547
DATED : February 22,1994
INVENTOR(S) : John S. Ligas et al It is certified that error appears in the above-indentified patent and that said Letters Patent is hereby corrected as shown below:

Column 15, claim 1, lines 32 and 33, "(d)" should be directly after "step".

Column 16, claim 14, line 42, "claim 12" should be --claim 13--.

Column 16, claim 9, line 17, "claim 8" should be --claim 7--.

Signed and Sealed this

Ninth Day of August, 1994

Attest:

BRUCE LEHMAN

*Attesting Officer*  *Commissioner of Patents and Trademarks*